(12) United States Patent
Yao et al.

(10) Patent No.: US 10,430,694 B2
(45) Date of Patent: Oct. 1, 2019

(54) FAST AND ACCURATE SKIN DETECTION USING ONLINE DISCRIMINATIVE MODELING

(71) Applicant: Intel Corporation, Santa Clara, CA (US)

(72) Inventors: Anbang Yao, Beijing (CN); Lin Xu, Beijing (CN); Yurong Chen, Beijing (CN)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 15/554,208

(22) PCT Filed: Apr. 15, 2015

(86) PCT No.: PCT/CN2015/076508
§ 371 (c)(1),
(2) Date: Aug. 28, 2017

(87) PCT Pub. No.: WO2016/165060
PCT Pub. Date: Oct. 20, 2016

(65) Prior Publication Data
US 2018/0039864 A1    Feb. 8, 2018

(51) Int. Cl.
| | |
|---|---|
| *G06K 9/46* | (2006.01) |
| *G06K 9/62* | (2006.01) |
| *G06K 9/38* | (2006.01) |
| *G06K 9/00* | (2006.01) |

(52) U.S. Cl.
CPC ............. *G06K 9/6268* (2013.01); *G06K 9/38* (2013.01); *G06K 9/4652* (2013.01); *G06K 9/6202* (2013.01); *G06K 9/00268* (2013.01); *G06K 9/4642* (2013.01)

(58) Field of Classification Search
CPC ...... G06K 9/38; G06K 9/4652; G06K 9/6268; G06K 9/6202
See application file for complete search history.

(56) References Cited

U.S. PATENT DOCUMENTS

| | | | |
|---|---|---|---|
| 7,430,333 B2 * | 9/2008 | Yu | G06T 5/009 |
| | | | 348/E9.042 |
| 8,406,482 B1 * | 3/2013 | Chien | G06K 9/4652 |
| | | | 382/115 |

(Continued)

FOREIGN PATENT DOCUMENTS

CN          103218615          7/2013

OTHER PUBLICATIONS

International Preliminary Report on Patentability dated Oct. 26, 2017 for PCT Patent Application No. PCT/CN15/76508.

(Continued)

*Primary Examiner* — Gregory M Desire
(74) *Attorney, Agent, or Firm* — Green, Howard & Mughal LLP.

(57) ABSTRACT

Techniques related to performing skin detection in an image are discussed. Such techniques may include generating skin and non-skin models based on a skin dominant region and another region, respectively, of the image and classifying individual pixels of the image via a discriminative skin likelihood function based on the skin model and the non-skin model.

20 Claims, 7 Drawing Sheets

(56) References Cited

U.S. PATENT DOCUMENTS

| | | | | |
|---|---|---|---|---|
| 8,452,091 | B2* | 5/2013 | Oh | G06K 9/00228 |
| | | | | 382/118 |
| 8,861,847 | B2 | 10/2014 | Srinivasan et al. | |
| 9,020,250 | B2* | 4/2015 | Singh | G09B 19/0076 |
| | | | | 382/162 |
| 2001/0026633 | A1* | 10/2001 | Abdel-Mottaleb | |
| | | | | G06K 9/00248 |
| | | | | 382/118 |
| 2008/0107341 | A1* | 5/2008 | Lu | G06K 9/00248 |
| | | | | 382/190 |
| 2010/0021056 | A1* | 1/2010 | Chen | G06K 9/00234 |
| | | | | 382/165 |
| 2017/0154238 | A1* | 6/2017 | Li | G06K 9/4652 |
| 2018/0039864 | A1* | 2/2018 | Yao | G06K 9/38 |

OTHER PUBLICATIONS

International Search Report & Written Opinion dated Jan. 20, 2016 for PCT Patent Application No. PCT/CN15/76508.
Kakumanu, P. et al., "A survey of skin-color modeling and detection methods", 2007 Pattern Recognition, vol. 40, pp. 1106-1122.
Phung, et al., "Skin segmentation using color pixel classification: analysis and comparison", IEEE Transactions on Pattern Analysis and Machine Intelligence, vol. 27, No. 1; pp. 148-154; 2005.
Sun, "Skin detection for single images using skin color modeling", Pattern Recognition, vol. 43, No. 4, pp. 1413-1420, 2010.
Tan, et al., "A fusion approach for efficient human skin detection", IEEE Transactions on Industrial Informatics, vol. 8, No. 1, pp. 138-147, 2014.

* cited by examiner

FAST AND ACCURATE SKIN DETECTION USING ONLINE DISCRIMINATIVE MODELING

CLAIM OF PRIORITY

This Application is a National Stage Entry of, and claims priority to, PCT Application No. PCT/CN2015/076508, filed on Apr. 2015 and titled "FAST AND ACCURATE SKIN DETECTION USING ONLINE DISCRIMINATIVE MODELING", which is incorporated by reference in its entirety for all purpose.

BACKGROUND

In image processing and computer vision contexts, color based skin detection techniques may be used in a wide range of applications such as digital make up, video based beautification, face tracking, 3-dimensional face modeling, hand gesture detection and tracking, people retrieval from databases, and the like. Furthermore, such applications are becoming increasingly popular particularly on camera embedded mobile devices such as smart phones, tablets, and the like. Therefore, robust and efficient skin detection technologies may be of increasing importance.

Skin detection techniques may seek to categorize each pixel in an image into a skin or non-skin class. In such contexts, the choice of color space for representing image pixels, the technique used for modeling and classifying skin, and the technique used for adapting to dynamic variations in video sequences may be three important factors. For example, many color spaces such as the red, green, blue (RGB) color space and linear and non-linear transformations from RGB such as the hue, saturation, value (HSV) representation of the RGB color space, the luma, blue difference, red difference (YCbCr) encoding of the RGB color space, the CIE-Lab color space, or the like may be used in skin detection. Furthermore, a variety of offline classifiers may be used in skin detection. Such classifiers may be trained via laborious and costly offline training such as allocating and annotating billions of training pixels. Furthermore, such classifiers may only be applicable and/or adaptable to a limited range of application scenarios and their performance may degrade sharply when used in unconstrained environments. To attain improved results in such environments, some models propose to update parameters of the offline training classifiers over time. However, such techniques are prone to problems with the introduction of unexpected errors from using false positives and other problems.

It may be advantageous to perform skin detection with high accuracy, easier implementation, and with less computational and memory resource requirements. It is with respect to these and other considerations that the present improvements have been needed. Such improvements may become critical as the desire to perform skin detection becomes more widespread.

BRIEF DESCRIPTION OF THE DRAWINGS

The material described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements. In the figures.

DETAILED DESCRIPTION

Figure 1:
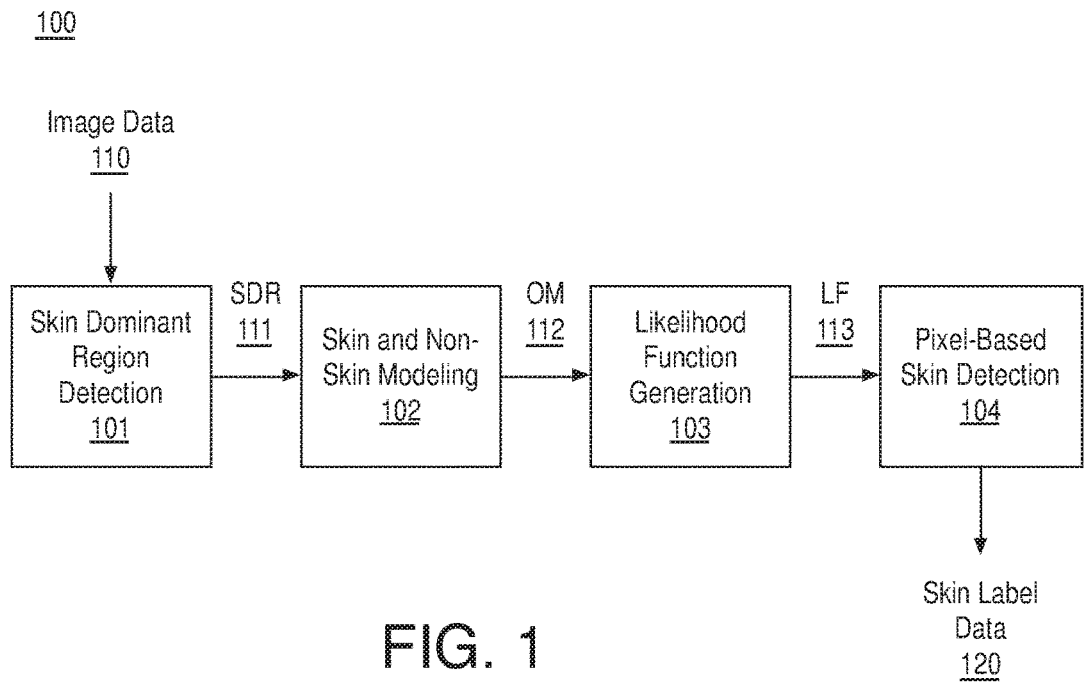
FIG. 1 illustrates an example device for performing skin detection.

One or more embodiments or implementations are now described with reference to the enclosed figures. While specific configurations and arrangements are discussed, it should be understood that this is done for illustrative purposes only. Persons skilled in the relevant art will recognize that other configurations and arrangements may be employed without departing from the spirit and scope of the description. It will be apparent to those skilled in the relevant art that techniques and/or arrangements described herein may also be employed in a variety of other systems and applications other than what is described herein.

While the following description sets forth various implementations that may be manifested in architectures such as system-on-a-chip (SoC) architectures for example, implementation of the techniques and/or arrangements described herein are not restricted to particular architectures and/or computing systems and may be implemented by any architecture and/or computing system for similar purposes. For instance, various architectures employing, for example, multiple integrated circuit (IC) chips and/or packages, and/or various computing devices and/or consumer electronic (CE) devices such as set top boxes, smart phones, etc., may implement the techniques and/or arrangements described herein. Further, while the following description may set forth numerous specific details such as logic implementations, types and interrelationships of system components, logic partitioning/integration choices, etc., claimed subject matter may be practiced without such specific details. In other instances, some material such as, for example, control structures and full software instruction sequences, may not be shown in detail in order not to obscure the material disclosed herein.

The material disclosed herein may be implemented in hardware, firmware, software, or any combination thereof. The material disclosed herein may also be implemented as instructions stored on a machine-readable medium, which may be read and executed by one or more processors. A machine-readable medium may include any medium and/or mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others.

References in the specification to "one implementation", "an implementation", "an example implementation", etc., indicate that the implementation described may include a particular feature, structure, or characteristic, but every embodiment may not necessarily include the particular feature, structure, or characteristic. Moreover, such phrases are not necessarily referring to the same implementation. Further, when a particular feature, structure, or characteristic is described in connection with an embodiment, it is submitted that it is within the knowledge of one skilled in the art to affect such feature, structure, or characteristic in connection with other implementations whether or not explicitly described herein.

Methods, devices, apparatuses, computing platforms, and articles are described herein related to skin detection and, in particular, to performing online skin detection based discriminative modeling.

As described above, skin detection techniques may seek to categorize each pixel in an image into a skin or non-skin class. It may be advantageous for such techniques to be highly accurate, to be adaptable to any color space, and to be implemented with low computational and memory resources.

In some embodiments discussed herein, skin detection may include generating a skin model based on a skin dominant region of an image and a non-skin model based on another region of the image. For example, the image may include a face detection region, hand detection region, or other region likely to include pixels representing skin. The skin dominant region may be detected or received as is discussed further herein. The skin model and non-skin model may include any suitable model such as a color histogram model or the like. Furthermore, the skin model and non-skin model may be based on any suitable information in the skin dominant region and the other region of the image such as color feature vectors associated with the pixels of such regions. For example, the color feature vectors may include one, two, or three, or more values associated with the color channels of image data associated with the image.

Based on the skin model and the non-skin model, a discriminative skin likelihood function may be determined. For example, the skin model and the non-skin model may represent color distributions or the like of image pixels in the skin dominant region and the other region, respectively. The discriminative skin likelihood function may measure the separation of clustered color values between the skin dominant region and the other region. Based on the discriminative skin likelihood function, individual pixels of the image may be classified as skin pixels or non-skin pixels and confidence values associated with the classifications may be determined. Such pixel classifications and/or confidence values may be used for a wide range of applications such as digital make up, video based beautification, face tracking, face enhancement, 3-dimensional face modeling, hand gesture detection and tracking, people retrieval from databases, or the like.

The skin detection techniques discussed herein may advantageously be performed online (e.g., based on image data obtained at implementation). Such techniques may offer the advantage of not requiring costly, difficult, and laborious offline training. Furthermore, such techniques may be fast, accurate, and implemented with a very small memory footprint compared with such offline trained models. The techniques discussed herein may be used on still images or image frames of a video sequence (e.g., video frames). For example, the skin detection techniques discussed herein may provide a video-based analytics application to generate skin pixels/non-skin pixel classification and/or associated confidence values.

FIG. 1 illustrates an example device 100 for performing skin detection, arranged in accordance with at least some implementations of the present disclosure. As shown in FIG. 1, device 100 may include a skin dominant region detection module 101, a skin and non-skin modeling module 102, a likelihood function generation module 103, and a pixel-based skin detection module 104. Device 100 may be any suitable form factor device such as a personal computer, a laptop computer, a tablet, a phablet, a smart phone, a digital camera, a gaming console, a wearable device, a display device, an all-in-one device, a two-in-one device, or the like. For example, device 100 may perform online skin detection as discussed herein.

As shown, skin dominant region detection module 101 may receive image data 110 (e.g., input image data representing or associated with an image of a scene). Image data 110 may include any suitable image or imaging data. In some examples, image data 110 may be received from an image sensor, an image signal processor, or the like. For example, image data 110 may include pixel values for each pixel of an input image and the pixel values may be provided for each channel of a color space such as R (red), G (green), and B (blue) values for image data in the RGB (red green blue) color space. Although discussed with respect to the RGB color space, the input pixel values may be in any suitable color space (or representation of a color space) such as the YUV (Y luminance, U chroma, and V chroma) color space, the YCbCr (luminance, blue difference, and red difference) color space, the HSV (hue, saturation, value) color space, the CIE-Lab color space, or the like. For example, image data 110 may be in a red green blue color space, a luminance chroma color space, a luminance blue difference red difference color space, a hue saturation value color space, or the like. Furthermore, image data 110 may include values for any number of pixels for any number or types of input image(s). For example, the input image may include a static image, an image frame of a video sequence, portions thereof (e.g., a slice or section of an image), or the like. In some examples, image data 110 may be full resolution image data. For example, techniques discussed herein may be efficiently implemented such that no downsampling may be needed to perform online processing of video.

As shown, skin dominant region detection module 101 may receive image data 110 and skin dominant region detection module 101 may generate skin dominant region data (SDR) 111. Skin dominant region detection module 101 may generate skin dominant region data 111 using any suitable technique or techniques. Furthermore, skin dominant region data 111 may include any suitable data or parameters representing a skin dominant region such as position information representing two or more corners of a rectangle (e.g., a bounding box), position and size information for other shapes (e.g., squares, circles, ovals, etc.), or the like. For example, skin dominant region detection module 101 may generate, and skin dominant region data 111 may represent, a coarse skin dominant area or region (e.g., associated with a face, a hand, etc.) in which most of the pixels therein belong to a skin category or classification.

As discussed, skin dominant region detection module 101 may generate skin dominant region data 111 using any suitable technique or techniques. In some examples, skin dominant region detection module 101 may receive or generate landmarks or landmark data indicative of a detected body part such as a face or hand or the like. For example, skin dominant region detection module 101 or another module of device 100 may implement facial or hand landmarks detection, tracking, and validation to generate such landmark data for faces or hands or the like.

Figure 2:
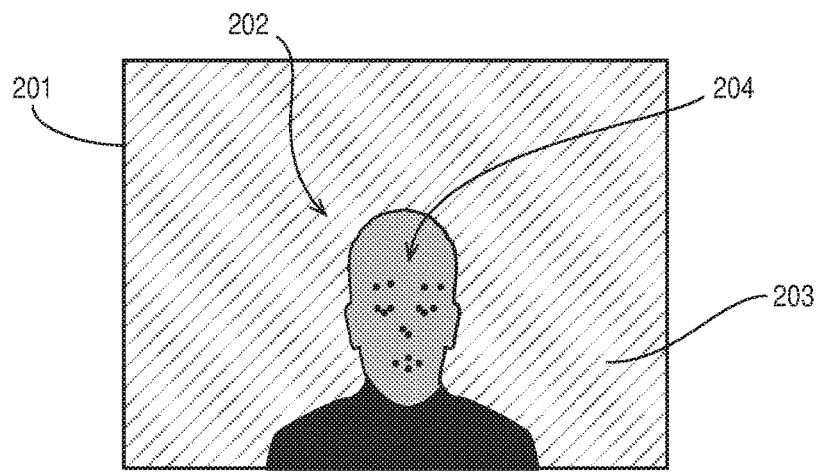
FIG. 2 illustrates example facial landmarks for an example image.

FIG. 2 illustrates example facial landmarks 204 for an example image 201, arranged in accordance with at least some implementations of the present disclosure. As shown in FIG. 2, image 201 may include a person 202 and a background 203. Furthermore, as shown, facial landmarks 204 may be associated with person 202. For example, facial landmarks 204 may include landmarks associated with eye features, eyebrow features, nose features, mouth features, or the like. For example, any number of facial landmarks 204 may be detected, tracked across image frames of a video sequence, and/or validated. In some examples, about 20 to 40 landmarks may be detected, tracked, and/or validated. Such facial landmarks 204 may be provided to or generated by skin dominant region detection module 101.

Returning to FIG. 1, as discussed, skin dominant region detection module 101 may generate or receive facial landmarks, hand landmarks, or the like indicative of skin region of an image. Skin dominant region detection module 101 may generate skin dominant region data 111 based on such landmarks. For example, skin dominant region detection module 101 may determine a minimum bounding box including such landmarks and expand the minimum bounding box to generate or provide a skin dominant region. For example, the skin dominant region may be represented via skin dominant region data 111 and provided to skin and non-skin modeling module 102.

As discussed, skin dominant region detection module 101 may determine a minimum bounding box around facial landmarks or hand landmarks or the like and expand the minimum bounding box to generate a skin dominant region. Skin dominant region detection module 101 may determine the minimum bounding box and expand it using any suitable technique or techniques to generate the skin dominant region. For example, the minimum bounding box (or a minimal circumscribed rectangle or the like) may be determined based on the positions of such landmarks. The minimum bounding box may be, for example, a rectangle of a minimum size that includes all of the landmarks. Furthermore, the minimum bounding box may be expanded to generate the skin dominant region. For example, the borders of the minimum bounding box may be expanded by a predefined amount (e.g., an expansion parameter or parameters defining expansion in directions around the minimum bounding box), by taking a factor of a padding parameter and the size of the original image, or the like.

For example, if $S=\{x_i, y_i\}_{i=1,\ldots,P}$ are the positions of P landmarks (e.g., successfully detected, tracked, and/or validated landmarks) in image $I_t$ (e.g., an image at time t, which may be an image frame of a video sequence), the minimum bounding box (e.g., minimal circumscribed region) may be provided as shown in Equations (1):

$$\begin{cases} v_{ul}(x) = \min_{i=1,\ldots,P}(x_i), & v_{ul}(y) = \min_{i=1,\ldots,P}(y_i) \\ v_{lr}(x) = \max_{i=1,\ldots,P}(x_i), & v_{lr}(y) = \max_{i=1,\ldots,P}(y_i) \end{cases} \quad (1)$$

where $\{v_{ul}(x), v_{ul}(y)\}$ and $\{v_{lr}(x), v_{lr}(y)\}$ may be positions of the upper-left (e.g., top-left) and lower-right (e.g., down-right) corners of the minimum bounding box within an image.

Furthermore, as discussed, the skin dominant region may be determined by expanding the minimum bounding box. For example, the skin dominant region may be determined as shown in Equations (2):

$$\begin{cases} \hat{v}_{ul}(x) = v_{ul}(x) - \alpha_1 w, & \hat{v}_{ul}(y) = v_{ul}(y) - \alpha_2 h \\ \hat{v}_{lr}(x) = v_{lr}(x) - \alpha_3 w, & \hat{v}_{lr}(y) = v_{lr}(y) - \alpha_4 h \end{cases} \quad (2)$$

where $\{\hat{v}_{ul}(x), \hat{v}_{ul}(y)\}$ and $\{\hat{v}_{lr}(x), \hat{v}_{lr}(y)\}$ may be positions of the upper-left (e.g., top-left) and lower-right (e.g., down-right) corners of the skin dominant region, $\{\alpha_1, \alpha_2, \alpha_3, \alpha_4\}$ may be padding ratios, and w and h may be the width and height of the original minimum bounding box (e.g., the width and height of the minimum circumscribed region as determined with respect to Equation (1)). The padding ratios may include any suitable values such as values in the range of about $\frac{1}{20}$ to $\frac{1}{10}$ or in the range of about $\frac{1}{10}$ to $\frac{1}{5}$ or the like. In some examples, some or all of the padding ratios may be the same and, in other examples, the may all be different.

Figure 3:
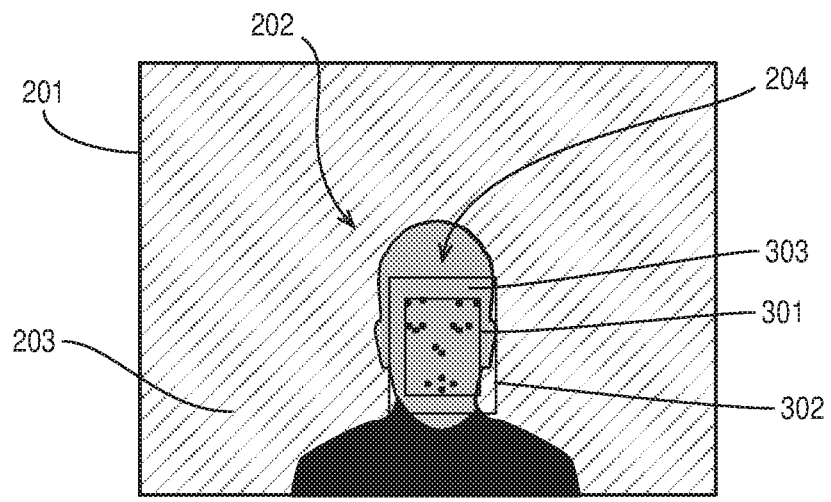
FIG. 3 illustrates an example minimum bounding box and an example skin dominant region.

FIG. 3 illustrates an example minimum bounding box 301 and an example skin dominant region 302, arranged in accordance with at least some implementations of the present disclosure. As shown in FIG. 3, minimum bounding box 301 may be provided such that minimum bounding box 301 is a minimum rectangle that includes facial landmarks 204. For example, minimum bounding box 301 may be generated as discussed herein with respect to Equations (1). Furthermore, FIG. 3 illustrates skin dominant region 302, which may include all of minimum bounding box 301 as well as a padding region or padding regions 303 between skin dominant region 302 and minimum bounding box 301. For example, skin dominant region 302 may be generated as discussed herein with respect to Equations (2). The dimensions of padding regions 303 may be controlled based on padding parameters or ratios such as those implemented via Equations (2) (e.g., padding ratios $\{\alpha_1, \alpha_2, \alpha_3, \alpha_4\}$) padding. For example, the padding above, below, left, and right of minimum bounding box 301 may be varied and controlled based on such padding parameters or ratios. Although discussed herein with respect to a rectangular minimum bounding box 301 and a rectangular skin dominant region 302, any suitable shape or shapes may be implemented. Furthermore, skin dominant region 302 may be characterized as a skin region, a foreground region, a facial region (in some contexts), a hand region (in some contexts), a region of interest, or the like.

As shown in FIG. 3, most skin pixels of person 202 may be within skin dominant region 302 and background 203 (e.g., the regions outside of skin dominant region 302) mostly includes non-skin pixels. It is noted that some non-skin pixels (e.g., pixels associated with eyebrows, eyeballs, mouths, lips, glasses, etc.) may also be included in skin dominant region 302, but the portion of such pixels within skin dominant region 302 is less than the portion of skin pixels. Similarly, background 203 may also include some skin pixels, but, again, the portion of such skin pixels is less than the portion of non-skin pixels. For example, online (e.g., real time) skin and non-skin modeling may be performed based on color values of pixels within skin dominant region 302 and color values of pixels outside of skin dominant region 302. A skin and a non-skin model may be constructed based on the color distributions of image pixels within skin dominant region 302 and those outside of skin dominant region 302.

Returning to FIG. 1, as discussed, skin dominant region detection module 101 may generate skin dominant region data 111 indicating a skin dominant region. As shown, skin dominant region detection module 101 may provide skin dominant region data 111 to skin and non-skin modeling module 102 and/or a memory of device 100 (not shown in FIG. 1).

Skin and non-skin modeling module 102 may receive skin dominant region data 111 and skin and non-skin modeling module 102 may generate a skin model and a non-skin model based on pixel values associated with pixels within the skin dominant region associated with skin dominant region data 111 and pixel values associated with another region of image data 110. For example, skin and non-skin modeling module 102 may also receive image data 110. Skin and non-skin modeling module 102 may generate the skin model and the non-skin model using any suitable technique or techniques. For example, skin and non-skin modeling module 102 may generate a skin model based on the color values of pixels within skin dominant region 302 and a non-skin model based on the color values of pixels within another region of image 201. The other region of image 201 may be any suitable region outside of skin dominant region 302. In some examples, the entirety of background 203 (e.g., the entirety of image 201 outside of skin dominant region 302) may be used to generate the non-skin model. In other examples, a random or preselected portion or sampling if image 201 region outside of skin dominant region 302 may be used. Furthermore, skin and non-skin modeling module 102 may provide the skin model and the non-skin model as online modeling data (OM) 112.

Skin and non-skin modeling module 102 may generate the skin model and the non-skin model using any suitable technique or techniques. In some examples, the skin model and the non-skin model may be generated or constructed as unit color histograms. Such techniques may offer the advantages of high efficiency and ease of implementation. For example, in the image It, $f=(\{u(x_k,y_k)\}_{k=1,\ldots,M}$ may be the color feature set of image pixels belonging to a skin dominant region (e.g., skin dominant region 302) or another, non-skin dominant region. For example, the color feature set of a skin dominant region may be characterized as $f_{skin}$ and the color feature set of a non-skin dominant region may be characterized as $f_{non-skin}$. Furthermore, $u(x_k,y_k)$ may be the color feature vector of an image pixel located at $(x_k,y_k)$. The color feature vector may be a 1-dimensional (1D), 2D, or 3D (or more) color vector in any color space. For example, the color feature vector may include one or more color values (e.g., including luma values) available at the pixel location based on the color space of image data 110. As discussed, image data 110 may be in any color space having any number of color channels. The color feature vector may include all, some, or one of such color channels. For example, if image data 110 is in a RGB color space, the color feature vector may be a 3D vector having an R value, a G value, and a B value or the color feature vector may be a 2D vector having an R value and a G value (or a G value and a B value or an R value and a B value). An advantage of the techniques discussed herein may be that no color conversion of image data 110 may be required, for example, and online modeling data 112 may be generated in the native color space of image data 110 (e.g., based on image capture via an image sensor and/or image capture processing via an image signal processor or the like).

As discussed, skin and non-skin modeling module 102 may generate a skin model and a non-skin model. In some examples, the skin model and the non-skin model may by unit color histograms based models. However, any suitable models may be used. For example, a unit color histogram may be generated for the skin dominant region and the other region as shown with respect to Equations (3) and (4):

$$H(i) = \frac{1}{M}\sum_{m=1}^{M} \delta(f(u(x_k, y_k)), i), i = 1, \ldots, N \quad (3)$$

$$f: u(x_k, y_k) \to \{1, \ldots, N\} \quad (4)$$

where H may be the unit histogram based model, M may be the number of pixels within the region, m may be a counter variable, f may map a color feature vector to a histogram bin as shown in Equation (4), i may be a particular histogram bin, N may be the number of histogram bins, and δ may be the Dirac delta function that counts the number of pixels in bin i. For example, the unit histogram based model of a skin dominant region may be characterized as $H_{skin}$ and the unit histogram based model of a non-skin dominant region may be characterized as $H_{non-skin}$.

As shown, pixels may be allocated to histogram bins based on the color feature vectors of the pixels. Any number of histogram bins may be implemented via the unit color histogram. For example, 16 bins per color channel may be used such that for 2D color feature vectors, 16×16=256 bins may be used and for 3D color feature vectors, 16×16×16=4096 bins may be used. However, other bins per channel such as 8 or 32 or 64 or the like may be used. Furthermore, in some examples the number of bins per channel may be the same and, in other examples, they may be different.

Furthermore, in some examples, the mapping function, f, may be implemented via a look up table and bit shifting techniques. For example, if each color channel may have a value in the range of 0 to 255 and the number of bins per color channel is 8, a look up table indexed by color value may return a 3 bit value associated with the bin number (e.g., ranging from 000 binary=0 base ten to 111 binary=7 base ten) for the associated bin. As discussed, any number of bins per channel, such as 16, 32, or 64 may be implemented. For multiple color channels, the same look up table may be used (e.g., to save memory in implementation) for each color channel and the results may be bit shifted to determine the final bin result. For example, consider an 8 bin per channel implementation for two color channels each having a possible range of color values from 0 to 255. In such an example, 64 bins total (e.g., 8 bins per channel for 2 channels) may be implemented and an access to the same look up table based on each color channel (e.g., two accesses to the same look up table) may provide a 3 bit value for each color channel. One of the 3 bit values may then be bit shifted by 3 bits and the results may be combined to determine the bin number for the color feature vector. For example, if a first look up table result (e.g., for a R color value) is 010 binary and a second look up table result (e.g., for a G color value) is 011 and the second look up table result is bit shifted by 3 bits and they are combined, the resultant 6 bit value of 011010 may indicate a bin number of 26 base ten of the available 64 bins. As discussed, such single look up table and bit shifting implementations may save memory of device 100.

As discussed, skin and non-skin modeling module 102 may generate online modeling data 112 including a skin model and a non-skin model. Online modeling data 112 may include any suitable data, parameters, or the like indicative of a skin model and a non-skin model. For example, online modeling data 112 may include unit histogram data (e.g., percentages of pixels within associated bins of the histogram), or the like. As shown, skin and non-skin modeling module 102 may provide online modeling data 112 to likelihood function generation module 103 and/or a memory of device 100.

Likelihood function generation module 103 may receive online modeling data 112 from skin and non-skin modeling module 102 or memory and likelihood function generation module 103 may generate likelihood function data 113. Likelihood function data 113 may include any suitable data or parameters or the like for implementing a likelihood function. For example, likelihood function data 113 may include data or parameters representative of a discriminative skin likelihood function. Furthermore, likelihood function generation module 103 may generate any suitable discriminative skin likelihood function such as, for example, a log-based discriminative skin likelihood function, a log-based classifier, a thresholding function, a Bayesian classifier, a Gaussian classifier, a multi-layer perceptron classifier, or a neural network classifier. Representative techniques are discussed herein with respect to a log-based classifier based on a thresholding, however, any suitable discriminative skin likelihood function useable to classify pixels of image data 110 may be implemented.

For example, the models generated via skin and non-skin modeling module 102 (e.g., $H_{skin}$ and $H_{non-skin}$) may represent the practical color distributions of image pixels in a skin dominant region (e.g., a facial region, a hand region, or the like) and a non-skin dominant region (e.g., a background region or the like). Such models may be used to determine a representative discriminative skin likelihood function. As discussed, the representative discriminative skin likelihood function may include any suitable discriminative function or classifier or the like. In some examples, the representative discriminative skin likelihood function may be provided as shown with respect to Equation (5):

$$L(i) = \log\left(\frac{\max(H_{skin}(i), \varepsilon)}{\max(H_{non-skin}(i), \varepsilon)}\right), i = 1, \ldots, N \quad (5)$$

where L may be the likelihood function (e.g., a discriminative skin likelihood function), i may be a particular histogram bin, N may be the number of histogram bins, $H_{skin}$ may be a unit color histogram based skin model, $H_{non-skin}$ may be a unit color histogram based non-skin model, and ε may be a small value constant (e.g., 0.001) to avoid possible meaningless arithmetic operations (e.g., division by zero). In some particular applications, e.g., images with low lighting or serious speckle noise, smoothing techniques such as window based mean filter and Gaussian filter may be used to suppress such types of noise. As shown in FIG. 1, likelihood function generation module 103 may provide likelihood function data 113 to pixel-based skin detection module 104 and/or a memory of device 100.

Pixel-based skin detection module 104 may receive likelihood function data 113 from likelihood function generation module 103 or memory and pixel-based skin detection module 104 may generate skin label data 120. For example, pixel-based skin detection module 104 may classify individual pixels of image data 110 (e.g., all pixels or sample pixels of image data 110) as skin pixels or non-skin pixels and skin label data 120 may include such classifications (e.g. as a binary image or mask including a value of 1 for skin pixels and a value of 0 for non-skin pixels or the like). For example, pixel-based skin detection module 104 may also receive image data 110 for performing such classifications. Furthermore, skin label data 120 may include, for each classified pixel of image data 110, a confidence value associated with the classification. For example, a pixel classified as a skin pixel with high confidence may include a binary value of 1 indicative of the skin pixel classification and a relatively high confidence value and a pixel classified as a skin pixel with low confidence may include a binary value of 1 indicative of the skin pixel classification but a relatively low confidence value. Such binary values and confidence values may be used by other modules of device 100 to perform digital make up, video based beautification, face tracking, face enhancement, 3-dimensional face modeling, hand gesture detection and tracking, people retrieval from databases, or the like. Skin label data 120 or other discussed herein may be characterized, for example, as skin detection data, skin map estimation data, skin modeling data, or the like.

For example, the likelihood function generated by likelihood function generation module 103 may measure the separation of clustered color values between a skin dominant region and another (non-skin dominant) region. Furthermore, as discussed, pixel-based skin detection module 104 may classify individual pixels of image data 110. For example, pixel-based skin detection module 104 may classify pixels as shown in Equation (6):

$$C(u(x_i, y_i)) = \begin{cases} 1 & \text{if } L(f(u(x_i, y_i))) > \tau \\ 0 & \text{otherwise} \end{cases} \quad (6)$$

where C may be the classification (e.g., 1 for pixels classified as skin pixels and 0 for pixels classified as non-skin pixels), L may be the likelihood function, and z may be a threshold value. For example, the threshold value may be characterized as a likelihood threshold, a skin pixel threshold, or the like. The threshold value may be any suitable value such as a value in the range of about −0.2 to about −0.3, a value in the range of about −0.2 to −0.25, or the like.

For example, as shown with respect to Equation (6), pixel-based skin detection module 104 may determine, for an individual pixel, $(x_i, y_i)$, a histogram bin (e.g., based on bin mapping function f) and a likelihood the pixel is a skin pixel (e.g., based on L). If the likelihood is greater than a threshold, τ, the pixel may be classified as a skin pixel (e.g., given a value of 1) and, if not, the pixel may be classified as a non-skin pixel (e.g., given a value of 0). For example, the bin mapping function may be implemented via a look up table and bit shifting techniques as discussed herein and the likelihood function may be implemented via any likelihood function or classifier as discussed herein. As discussed, the classification and/or the likelihood may be provided as a portion of skin label data 120. For example, the likelihood or skin classification value or the like for a particular pixel (e.g., $L(f(u(x_i, y_i)))$) may be provided as a real-valued confidence or confidence value and, in some examples, the likelihood may be quantized or vectorized to a value in the range of 0 to 255, 0 to 128, or the like for inclusion in skin label data 120.

Figure 4:
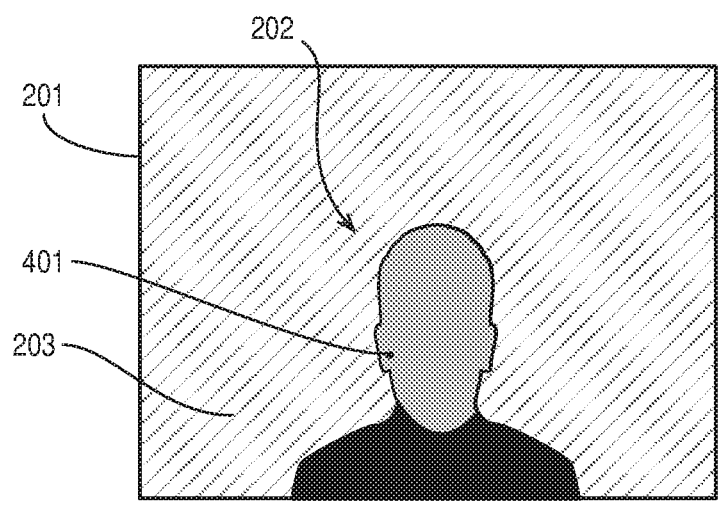
FIG. 4 illustrates classification of an example individual pixel.

FIG. 4 illustrates classification of an example individual pixel 401, arranged in accordance with at least some implementations of the present disclosure. As shown in FIG. 4, each pixel or some pixels of image 201 such as individual pixel 401 may be classified as skin or non-skin pixels. For example, a color feature vector associated with individual pixel 401 may be determined and a classification and/or confidence value associated with individual pixel 401 may be generated for inclusion in skin label data 120. For example, pixel-based skin detection module 104 may scan across and down image 201 classifying each pixel (or sample pixels) and generating confidence values for inclusion in skin label data 120.

As discussed, the described techniques may provide high quality skin detection based on image data and without the need for offline training. Such techniques may be advantageous particularly in video applications. For example, the image data or images discussed herein may be image frames of a video sequence. The described techniques may be implemented online (e.g., without requiring offline training) and in real time on a frame by frame basis to implement skin detection for video applications.

Figure 5:
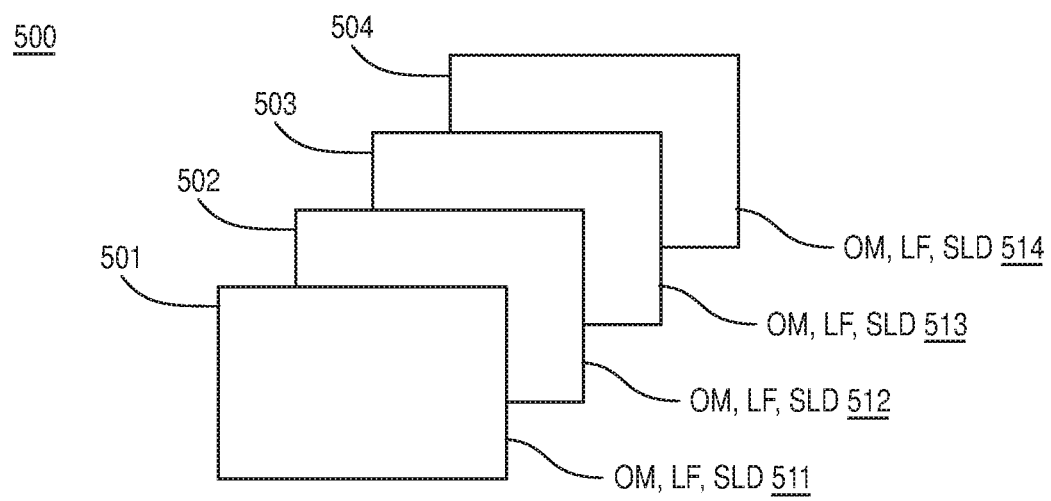
FIG. 5 illustrates skin detection applied to an example video sequence.

FIG. 5 illustrates skin detection applied to an example video sequence 500, arranged in accordance with at least some implementations of the present disclosure. As shown in FIG. 5, video sequence 500 may include a current frame 501 and any number of subsequent frames 502-504. Video sequence 500 may include video at any suitable resolution and any suitable frame rate. For example, current frame 501 and subsequent frames 502-504 may be characterized as image frames or video frames or the like and any or all of frames 501-504 may processed as discussed herein to generate online model, likelihood function, and skin label data 511-514. For example, online model, likelihood function, and skin label data 511-514 may include online modeling data 112, likelihood function data 113, and skin label data 120 as discussed with respect to FIG. 1 for each of frames 501-504. As shown, in some examples, online model, likelihood function, and skin label data 511-514 may be generated for each of frames 501-504. In other examples, online model, likelihood function, and skin label data 511-514 may be generated for some frames. For example, online model, likelihood function, and skin label data 511-514 may be generated based on a predetermined sampling pattern or based on a demand from a module or driver or the like of device 100.

In some examples, generating online model, likelihood function, and skin label data 511-514 may be performed online (e.g., without offline training or the like) for frames 501-504 during capture of video sequence 500, during playback or presentment of video sequence 500, or during any other processing associated with video sequence 500. Furthermore, online model, likelihood function, and skin label data 511 may be generated for current frame 501 (e.g., pixels of current frame 501 may be classified) prior to frame 502 being received (e.g., received based on video capture or received for processing or the like). For example, the processing discussed herein may be performed for each of frames 501-504 of video sequence 500 before the next frame is received for processing.

In some examples, subsequent to processing an image frame (e.g., current frame 501) as discussed herein to generate online model, likelihood function, and skin label data 511, a subsequent frame (e.g., subsequent frame 502) may be received for processing. In such examples, a skin model and a non-skin model may be generated based on subsequent frame 502, a discriminative skin likelihood function may be determined based on the skin model and the non-skin model for subsequent frame 502, and individual pixels of subsequent frame 502 may be classified based on the discriminative skin likelihood function for subsequent frame 502 to generate second skin label data associated with the second image frame. Such processing may be performed using any technique or techniques discussed herein. For example, such processing may generate online model, likelihood function, and skin label data 512 associated with subsequent frame 502. Such processing may be repeated for any number of frames of video sequence 500.

With reference to FIG. 3, as discussed, skin dominant region 302 may be generated and used for skin detection with respect to image 201. In such examples, a single skin dominant region (e.g., skin dominant region 302) may be determined for an image. In other examples, two or more skin dominant regions may be determined for an image (e.g., an image including multiple hands or multiple faces or the like).

Figure 6:
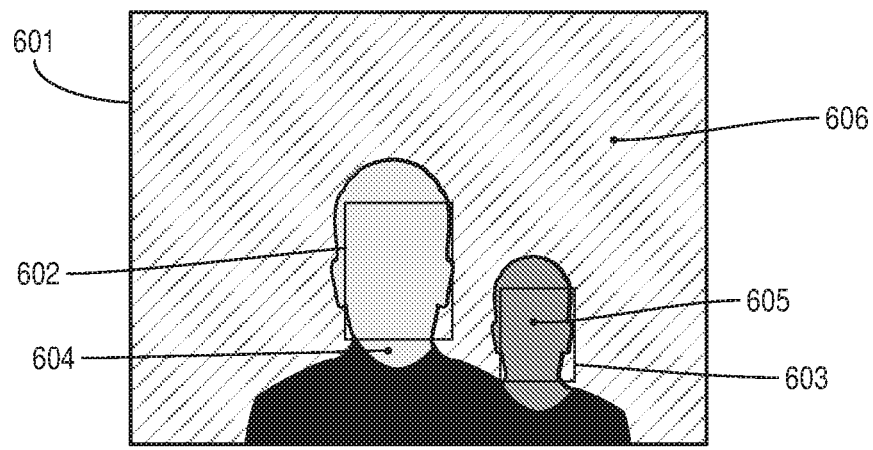
FIG. 6 illustrates an example image including multiple example skin dominant regions.

FIG. 6 illustrates an example image 601 including multiple example skin dominant regions, 602, 603, arranged in accordance with at least some implementations of the present disclosure. As shown in FIG. 6, in some examples, image 601 may include two skin dominant regions 602, 603. However, image 601 may include any number of skin dominant regions. With reference to FIG. 1, skin dominant region data 111 may include data or indicators indicative of multiple skin dominant regions. Such multiple skin dominant regions may be determined or generated using any suitable technique or techniques such as those discussed herein. In some examples, the multiple skin dominant regions may be based on facial or hand landmarks such that minimum bounding boxes may be generated and expanded to generate the multiple skin dominant regions. For example, the multiple skin dominant regions may be generated as discussed herein with respect to Equations (1) and Equations (2).

With reference to FIG. 1, in some examples, skin and non-skin modeling module 102 may combine such multiple skin dominant regions to generate a skin model as discussed herein. For example, all pixels of the multiple skin dominant regions may be combined and used to generate a single skin model. For example, any skin model discussed herein may be generated using such multiple skin dominant region combining techniques. In some examples, with reference to Equation (3), a single unit histogram based skin model may be generated based on all pixels of the multiple skin dominant regions (e.g., based on combining the multiple skin dominant regions). In such examples, processing may continue as discussed with respect to FIG. 1, with likelihood function generation module 103 generating likelihood function data 113 based on the combined skin model and a non-skin model and pixel-based skin detection module 104 generating skin label data 120 including skin and non-skin labels and/or confidence values as discussed herein.

In other examples, skin and non-skin modeling module 102 may generate multiple skin models based on such multiple skin dominant regions For example, skin and non-skin modeling module 102 may generate a separate skin model for each skin dominant region (or skin and non-skin modeling module 102 may combine some multiple skin dominant regions based on color similarity or the like). For example, skin and non-skin modeling module 102 may generate a skin model associated with skin dominant region 602 and another skin model associated with skin dominant region 603. In such examples, online modeling data 112 may include such two or more skin models and a non-skin model. Such models may be based on any modeling techniques discussed herein.

Furthermore, likelihood function generation module 103 may generate multiple likelihood functions based on such multiple skin models and pixel-based skin detection module 104 may classify pixels as skin pixels and non-skin pixels as well as skin pixels of a first skin dominant region, skin pixels of a second skin dominant region, and so on. Such classifications may be associated with confidence values as discussed herein. For example, an individual pixel 604 of image 601 may be classified as a skin pixel with a relatively high confidence and as a skin pixel associated skin dominant region 602 with relatively high confidence, an individual pixel 605 of image 601 may be classified as a skin pixel with a relatively high confidence and as a skin pixel associated skin dominant region 603 with relatively high confidence, and an individual pixel 606 of image 601 may be classified as a non-skin pixel with a relatively high confidence.

The techniques discussed with respect to device 100 may provide high quality skin detection with relatively low computational cost and a relatively low memory footprint. For example, the techniques discussed herein may offer the advantages of automatic online skin and non-skin modeling on an image by image or frame by frame basis, applicability to any color space, and low negative impacts based on image illumination, viewpoint, subject ethnicity, cluttered image backgrounds, and the like. Furthermore, the discussed techniques may provide improved accuracy, computational efficiency, and a small memory footprint. For example, the described techniques may use just 12 KBs of memory and, on video frames with a resolution of 1280×720, may run at a speed of about 4 ms per frame (scanning over all image frame pixels without downsampling) on a conventional personal computer.

Figure 7:
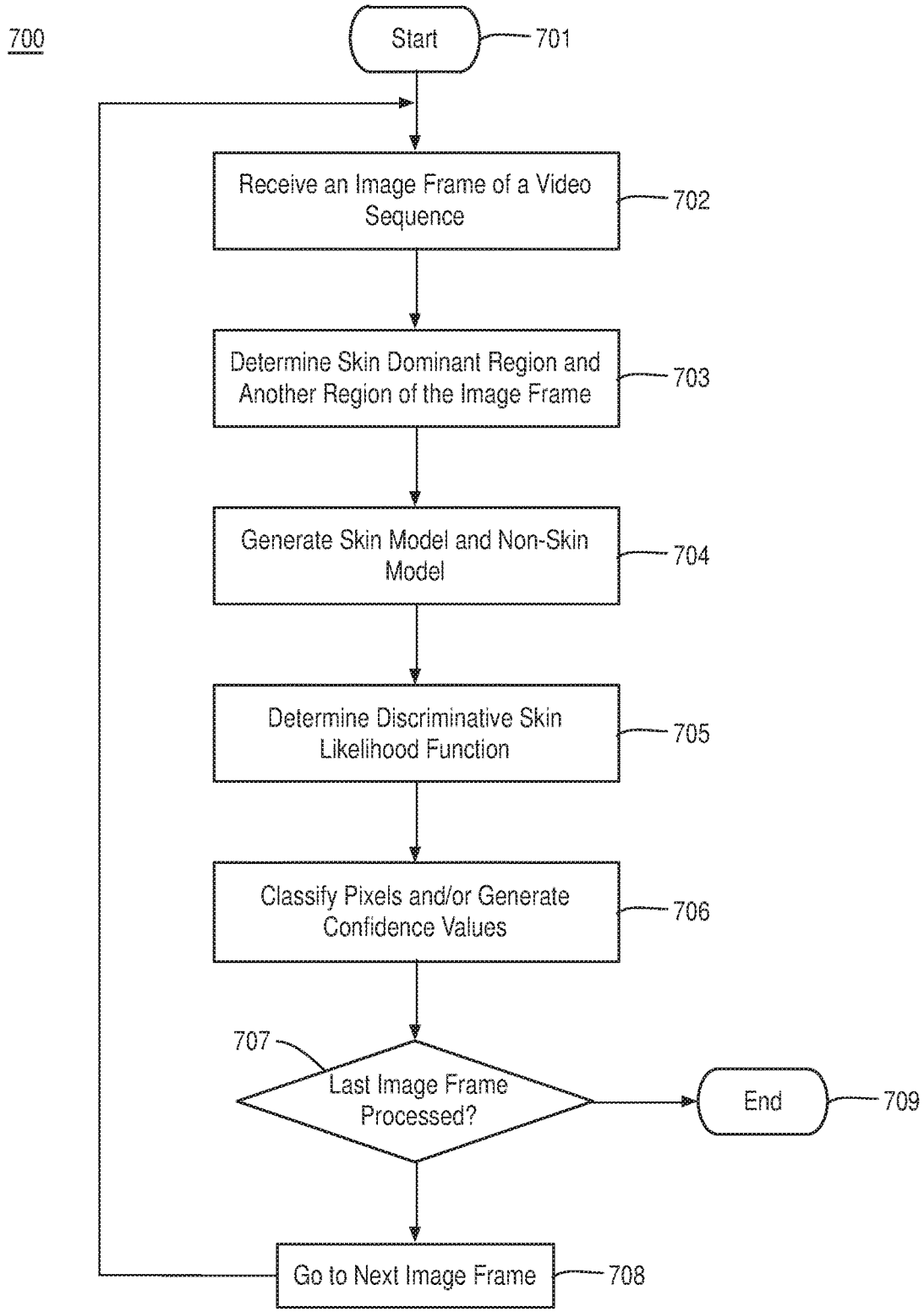
FIG. 7 is a flow diagram illustrating an example process for performing skin detection.

FIG. 7 is a flow diagram illustrating an example process 700 for performing skin detection, arranged in accordance with at least some implementations of the present disclosure. Process 700 may include one or more operations 701-709 as illustrated in FIG. 7. Process 700 may be performed by a device (e.g., device 100, any other devices or systems discussed herein) or portions of process 700 may be performed by a device to provide skin detection and/or classification. Process 700 or portions thereof may be repeated for any number of image frames, video sequences, or the like.

As shown, process 700 may begin from start operation 701 at operation 702, "Receive an Image Frame of a Video Sequence", where an image frame of a video sequence may be received. For example, current frame 501 of video sequence 500 may be received via an image sensor, an image processor, or the like. Although process 700 is discussed with respect to video processing, process 700 may be performed for still images or the like. The image frame received via operation 702 may include image data in any suitable format and any color space such as those discussed herein.

Process 700 may continue at operation 703, "Determine Skin Dominant Region and Another Region of the Image Frame", where a skin dominant region and another region of the image frame may be determined. For example, the skin dominant region may be determined using any techniques discussed herein such as landmark determination, minimum bounding box generation, and expansion of the minimum bounding box to generate the skin dominant region. Furthermore, the skin dominant region may be determined based on the detection of any object such as a face or a hand or the like. As discussed with respect to FIG. 6, a single skin dominant region or multiple skin dominant regions may be determined. If no skin dominant region is determined at operation 703, processing may skip to decision operation 707, which is discussed further below. The other region of the image frame may include the background region of the image frame or any other non-skin dominant region of the image frame.

Process 700 may continue at operation 704, "Generate Skin Model and Non-Skin Model", where a skin model may be generated based on the skin dominant region and a non-skin model may be generated based on the other region. Such models may include any suitable models such as color based models as discussed herein. For example, such models may be based on color feature vectors of pixels within the skin dominant region and the other region. For example, the skin model and the non-skin model may be unit histogram models as discussed herein. In examples, where multiple skin dominant regions are determined at operation 703, such skin dominant regions may be combined to generate a single skin model or multiple skin models may be generated for such the skin dominant regions.

Process 700 may continue at operation 705, "Determine Discriminative Skin Likelihood Function", where one or more discriminative skin likelihood functions may be determined based on the models generated at operation 704. The discriminative skin likelihood function or functions determined at operation 705 may include any discriminative skin likelihood functions discussed herein such as a log-based discriminative skin likelihood function, a log-based classifier, a thresholding function, a Bayesian classifier, a Gaussian classifier, a multi-layer perceptron classifier, a neural network classifier, or the like.

Process 700 may continue at operation 706, "Classify Pixels and/or Generate Confidence Values", where pixels of the image frame received at operation 702 may be classified as skin or non-skin pixels and/or confidence values associated with such classifications may be generated. For example, individual pixels of the image frame may be classified based on the discriminative skin likelihood function determined at operation 705. For example, each pixel of the image frame may be classified (e.g., provided a 1 if classified as a skin pixel and a 0 if not) and provided a confidence value (e.g., such as a value ranging from 0 to 1, 0 to 255, 0 to 128, or the like associated with the confidence of the classification) may be generated at operation 706.

Process 700 may continue at decision operation 707, "Last Image Frame Processed?", from operation 703 if no skin dominant region was determined or from operation 706 if a skin dominant region was determined. At decision operation 707, a determination may be made as to whether the last image frame of the video sequence has been processed. If not, process 700 may continue at operation 708, where the process may proceed to the next image frame and at operation 702 where the next image frame may be received and processed as discussed herein. If a determination is made at decision operation 707 that the last image frame has been processed, process 700 may end at end operation 709.

As discussed, process 700 may be used to perform skin detection. Process 700 may be performed in parallel or in series for any number of image frames, video sequences, or the like. Furthermore, process 700 may provide a process flow for performing skin detection on all image frames of a video sequence. In other examples, only some image frames (e.g., a selected subset such as every other, every third, or the like) of a video sequence may be processed via operations 702-706. In yet other examples, process 700 may be evoked by a user or a driver or the like that indicates a video sequence is to be processed for skin detection. Such an evocation may include an image frame sampling pattern (e.g., all, every other, etc.) or the like.

The techniques discussed herein provide high quality skin detection with relatively low computational cost and a relatively low memory footprint. In an example implementation, the techniques discussed herein were applied to 35 video sequences including over 7,000 image frames and compared to results from existing techniques. For example, the implementation may include 2D color feature vectors using the red and green channels of RGB image data, unit histogram models having 32×32 bins (e.g., N=1024), a threshold value, $\tau$, of −0.2231, and a constant small value, $\varepsilon$, of 0.001. The results of the techniques discussed herein provide accurate skin pixel classification even in difficult image frames including background clutter, low illumination, varied user ethnicity, and so on. The techniques discussed herein also provide accurate classification of non-skin pixels in eyebrows, mouth lips, eyeballs and glasses (e.g., in locations close to skin pixels) providing accurate discrimination between skin and non-skin pixels. Furthermore, on video sequences having image frames with a frame resolution of 1280×720 pixels, the techniques discussed herein run with a speed of about 4 ms per frame (e.g., scanning over all image pixels without applying any down sampling) on a conventional personal computer, which may be about 5× faster than the current techniques with down-sampling applied (e.g., with 2×2 downsampling). For example, the techniques discussed herein may provide a failure frame rate (e.g., a failed frame having >50% false positives or false negatives) of about 1%, may process frames at an image frame size of 1280×720 pixels at a rate of about 250 frames per second, and may have a model size (e.g., as implemented in memory) of about 12 KB.

Figure 8:
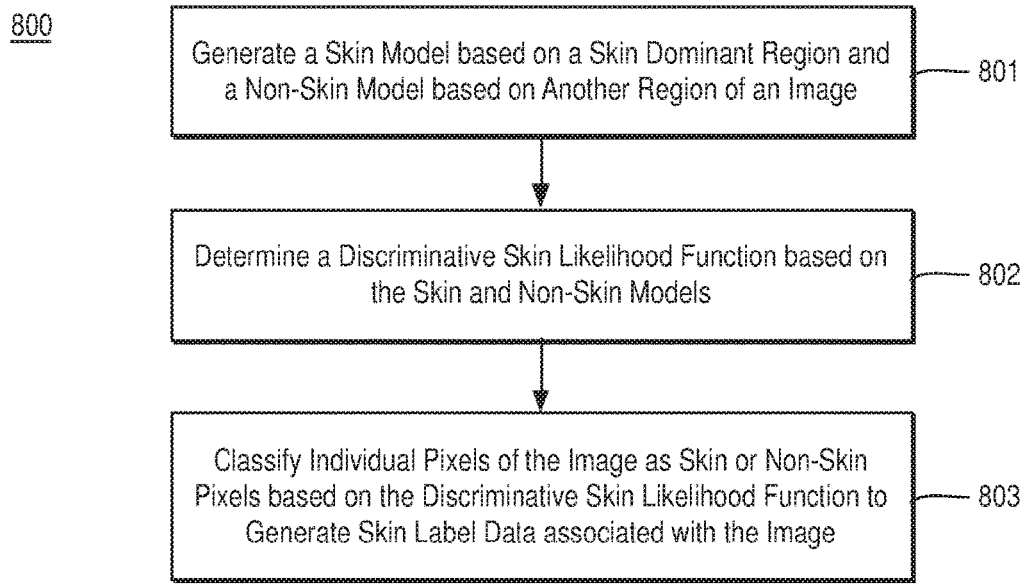
FIG. 8 is a flow diagram illustrating an example process for performing skin detection.

FIG. 8 is a flow diagram illustrating an example process 800 for performing skin detection, arranged in accordance with at least some implementations of the present disclosure. Process 800 may include one or more operations 801-803 as illustrated in FIG. 8. Process 800 may form at least part of a skin detection process. By way of non-limiting example, process 800 may form at least part of a skin detection process as performed by device 100 as discussed herein. Furthermore, process 800 will be described herein with reference to system 900 of FIG. 9.

Figure 9:
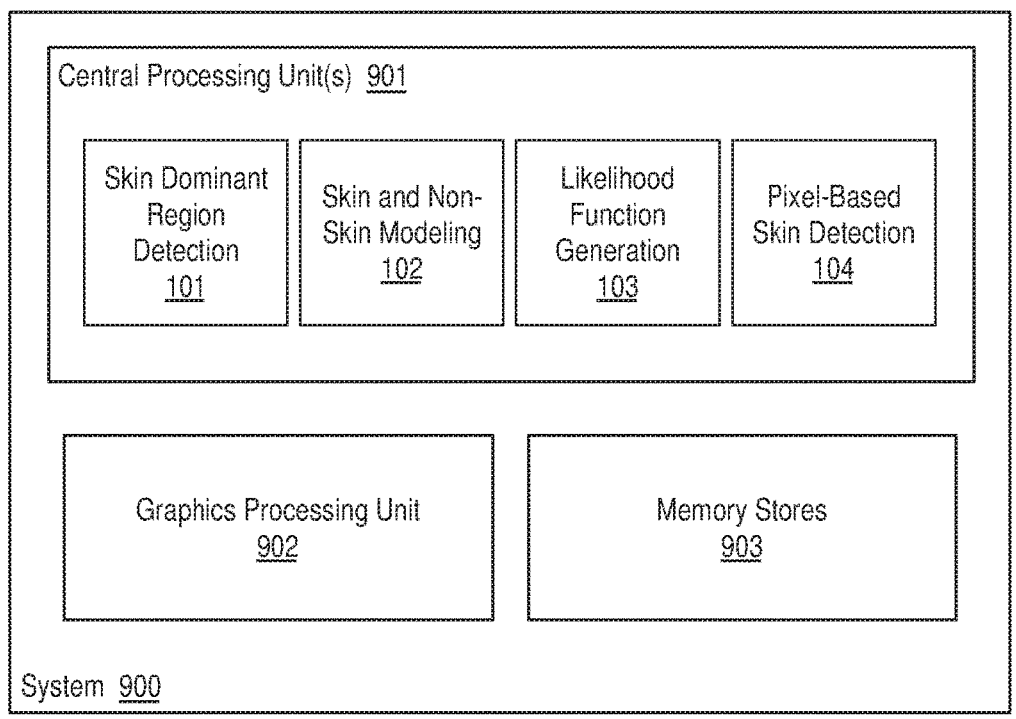
FIG. 9 is an illustrative diagram of an example system for performing skin detection.

FIG. 9 is an illustrative diagram of an example system 900 for performing skin detection, arranged in accordance with at least some implementations of the present disclosure. As shown in FIG. 9, system 900 may include one or more central processing units (CPU) 901, a graphics processing unit (GPU) 902, and memory stores 903. Also as shown, CPU 901 may include skin dominant region detection module 101, skin and non-skin modeling module 102, likelihood function generation module 103, and pixel-based skin detection module 104. In the example of system 900, memory stores 903 may store imaging, video, or related content such as image data, images, image frames, video frames, video sequences, pixel data, color feature vectors, landmark data, bounding box data, skin dominant regions, skin dominant region data, skin models, non-skin models, online modeling data, likelihood functions, likelihood function parameters, look up tables, likelihood function data, thresholds, small value constants, skin labels, confidence values, skin label data, and/or any other data as discussed herein.

As shown, in some examples, skin dominant region detection module 101, skin and non-skin modeling module 102, likelihood function generation module 103, and pixel-based skin detection module 104 may be implemented via central processing units 901. In other examples, one or more or portions of skin dominant region detection module 101, skin and non-skin modeling module 102, likelihood function generation module 103, and pixel-based skin detection module 104 may be implemented via graphics processing unit 902, an image processing unit, an image processing pipeline, or the like.

Graphics processing unit 902 may include any number and type of graphics processing units that may provide the operations as discussed herein. Such operations may be implemented via software or hardware or a combination thereof. For example, graphics processing unit 902 may include circuitry dedicated to manipulate images obtained from memory stores 903. Central processing units 901 may include any number and type of processing units or modules that may provide control and other high level functions for system 900 and/or provide any operations as discussed herein. Memory stores 903 may be any type of memory such as volatile memory (e.g., Static Random Access Memory (SRAM), Dynamic Random Access Memory (DRAM), etc.) or non-volatile memory (e.g., flash memory, etc.), and so forth. In a non-limiting example, memory stores 903 may be implemented by cache memory. In an embodiment, one or more or portions of skin dominant region detection module 101, skin and non-skin modeling module 102, likelihood function generation module 103, and pixel-based skin detection module 104 may be implemented via an execution unit (EU) of graphics processing unit 902. The EU may include, for example, programmable logic or circuitry such as a logic core or cores that may provide a wide array of programmable logic functions. In an embodiment, one or more or portions of skin dominant region detection module 101, skin and non-skin modeling module 102, likelihood function generation module 103, and pixel-based skin detection module 104 may be implemented via dedicated hardware such as fixed function circuitry or the like. Fixed function circuitry may include dedicated logic or circuitry and may provide a set of fixed function entry points that may map to the dedicated logic for a fixed purpose or function.

Returning to discussion of FIG. 8, process 800 may begin at operation 801, "Generate a Skin Model based on a Skin Dominant Region and a Non-Skin Model based on Another Region of an Image", where a skin model may be generated based on a skin dominant region of an image and a non-skin model may be generated based on another region of the image. For example, the skin model and/or the non-skin model may be any model or models discussed herein such as a color histogram based skin model or the like. For example, skin and non-skin modeling module 102 as implemented via central processing unit 901 may generate the skin model based on a skin dominant region of an image and the non-skin model based on another region of the image. The image may include any suitable image or image data such as a still image, an image frame of a video sequence, or the like. Furthermore, the image may be associated with image data in any color space such as a red green blue color space, a luminance chroma color space, a luminance blue difference red difference color space, a hue saturation value color space, or the like. In some examples, the skin model may be based on all color channels of the color space and, in other examples, only one or some of the color channels may be used. In some examples, the color space may be a red, green, blue color space and the skin model may be based on red and green channels of the red, green, blue color space.

In some examples, the skin dominant region may be determined based on landmarks or the like associated with the image. For example, prior to operation 801, process 800 may include determining a minimum bounding box based facial feature landmarks associated with the image and expanding the minimum bounding box to generate the skin dominant region. For example, skin dominant region detection module 101 as implemented via central processing unit 901 may generate or receive the landmarks (e.g., facial or hand or the like), determine the minimum bounding box based on the landmarks, and expand the minimum bounding box to generate the skin dominant region.

Processing may continue at operation 802, "Determine a Discriminative Skin Likelihood Function based on the Skin and Non-Skin Models", where a discriminative skin likelihood function may be determined based on the skin model and the non-skin model. The skin likelihood function may be determined using any suitable technique or techniques and the skin likelihood function may include any suitable likelihood function. For example, the discriminative skin likelihood function may be a log-based discriminative skin likelihood function, a log-based classifier, a thresholding function, a Bayesian classifier, a Gaussian classifier, a multi-layer perceptron classifier, a neural network classifier, or the like. For example, likelihood function generation module 103 as implemented via central processing unit 901 may determine the discriminative skin likelihood function.

Processing may continue at operation 803, "Classify Individual Pixels of the Image as Skin or Non-Skin Pixels based on the Discriminative Skin Likelihood Function to Generate Skin Label Data associated with the Image", where individual pixels of the image may be classified as skin pixels or non-skin pixels based on the discriminative skin likelihood function to generate skin label data associated with the image. Furthermore, confidence values associated with the classification may be determined or the individual pixels and included as a part of the skin label data. For example, pixel-based skin detection module 104 as implemented via central processing unit 901 may classify the individual pixels and generate the confidence values to generate the skin label data. In some examples, the skin model may be a color histogram based skin model, the discriminative skin likelihood function may be a log-based discriminative skin likelihood function, and classifying individual pixels may include comparing a skin classification value for an individual pixel to a predetermined threshold value.

As discussed, process 800 may be applied to an image frame (e.g., a video frame) of a video sequence such that the image is an image frame of the video sequence. In such examples, generating the skin model and the non-skin model, determining the discriminative skin likelihood function, and classifying the individual pixels may be performed online during processing of the video sequence. Furthermore, in such examples, a second image frame of the video sequence may be received, a second skin model and a second non-skin model may be generated based on the second image frame, a second discriminative skin likelihood function may be determined based on the second skin model and the second non-skin model, and second individual pixels of the second image frame may be classified based on the second discriminative skin likelihood function to generate second skin label data associated with the second image frame. For example, the second image frame may be received after the individual pixels of the image (e.g., the prior image frame in the video sequence) are classified.

Also, as discussed, in some examples, multiple skin dominant regions (e.g., including a second skin dominant region) may be determined within an image. In some examples, the multiple skin dominant regions may be combined in generating the skin model. In other examples, a second skin model may be generated based on the second skin dominant region of the image and a second discriminative skin likelihood function may be determined based on the second skin model and the second non-skin model. Furthermore, classifying the individual pixels of the image may further include classifying the individual pixels as first skin pixels associated with the skin dominant region or second skin pixels associated with the second skin dominant region.

Process 800 may be repeated any number of times either in series or in parallel for any number images, image frames, video frames, portions thereof, or the like. As discussed, process 800 may provide for skin label data including a binary skin label image or mask and associated confidence values. For example, the discussed techniques may provide accurate and fast skin detection.

Various components of the systems described herein may be implemented in software, firmware, and/or hardware and/or any combination thereof. For example, various components of device 100, system 900, system 1000, or device 1100 may be provided, at least in part, by hardware of a computing System-on-a-Chip (SoC) such as may be found in a computing system such as, for example, a smart phone. Those skilled in the art may recognize that systems described herein may include additional components that have not been depicted in the corresponding figures. For example, the systems discussed herein may include additional components such as bit stream multiplexer or de-multiplexer modules and the like that have not been depicted in the interest of clarity.

While implementation of the example processes discussed herein may include the undertaking of all operations shown in the order illustrated, the present disclosure is not limited in this regard and, in various examples, implementation of the example processes herein may include only a subset of the operations shown, operations performed in a different order than illustrated, or additional operations.

In addition, any one or more of the operations discussed herein may be undertaken in response to instructions provided by one or more computer program products. Such program products may include signal bearing media providing instructions that, when executed by, for example, a processor, may provide the functionality described herein. The computer program products may be provided in any form of one or more machine-readable media. Thus, for example, a processor including one or more graphics processing unit(s) or processor core(s) may undertake one or more of the blocks of the example processes herein in response to program code and/or instructions or instruction sets conveyed to the processor by one or more machine-readable media. In general, a machine-readable medium may convey software in the form of program code and/or instructions or instruction sets that may cause any of the devices and/or systems described herein to implement at least portions of process 700, process 800 or any operations discussed herein and/or any portions of device 100, system 900, system 1000, device 1100, or any other module or component as discussed herein.

As used in any implementation described herein, the term "module" refers to any combination of software logic, firmware logic, hardware logic, and/or circuitry configured to provide the functionality described herein. The software may be embodied as a software package, code and/or instruction set or instructions, and "hardware", as used in any implementation described herein, may include, for example, singly or in any combination, hardwired circuitry, programmable circuitry, state machine circuitry, fixed function circuitry, execution unit circuitry, and/or firmware that stores instructions executed by programmable circuitry. The modules may, collectively or individually, be embodied as circuitry that forms part of a larger system, for example, an integrated circuit (IC), system on-chip (SoC), and so forth.

Figure 10:
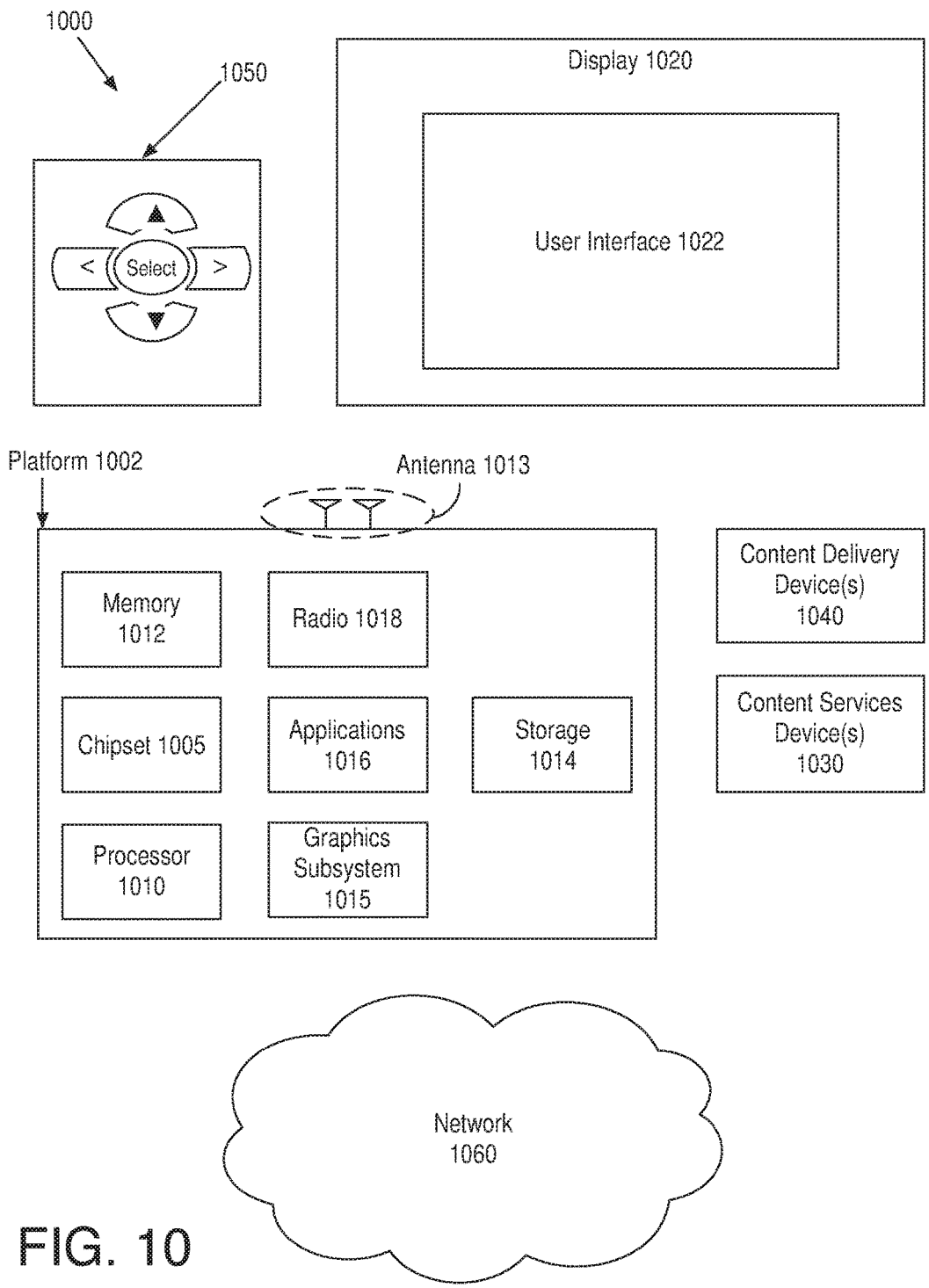
FIG. 10 is an illustrative diagram of an example system.

FIG. 10 is an illustrative diagram of an example system 1000, arranged in accordance with at least some implementations of the present disclosure. In various implementations, system 1000 may be a media system although system 1000 is not limited to this context. For example, system 1000 may be incorporated into a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, cameras (e.g. point-and-shoot cameras, super-zoom cameras, digital single-lens reflex (DSLR) cameras), and so forth.

In various implementations, system 1000 includes a platform 1002 coupled to a display 1020. Platform 1002 may receive content from a content device such as content services device(s) 1030 or content delivery device(s) 1040 or other similar content sources. A navigation controller 1050 including one or more navigation features may be used to interact with, for example, platform 1002 and/or display 1020. Each of these components is described in greater detail below.

In various implementations, platform 1002 may include any combination of a chipset 1005, processor 1010, memory 1012, antenna 1013, storage 1014, graphics subsystem 1015, applications 1016 and/or radio 1018. Chipset 1005 may provide intercommunication among processor 1010, memory 1012, storage 1014, graphics subsystem 1015, applications 1016 and/or radio 1018. For example, chipset 1005 may include a storage adapter (not depicted) capable of providing intercommunication with storage 1014.

Processor 1010 may be implemented as a Complex Instruction Set Computer (CISC) or Reduced Instruction Set Computer (RISC) processors, x86 instruction set compatible processors, multi-core, or any other microprocessor or central processing unit (CPU). In various implementations, processor 1010 may be dual-core processor(s), dual-core mobile processor(s), and so forth.

Memory 1012 may be implemented as a volatile memory device such as, but not limited to, a Random Access Memory (RAM), Dynamic Random Access Memory (DRAM), or Static RAM (SRAM).

Storage 1014 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In various implementations, storage 1014 may include technology to increase the storage performance enhanced protection for valuable digital media when multiple hard drives are included, for example.

Graphics subsystem 1015 may perform processing of images such as still or video for display. Graphics subsystem 1015 may be a graphics processing unit (GPU) or a visual processing unit (VPU), for example. An analog or digital interface may be used to communicatively couple graphics subsystem 1015 and display 1020. For example, the interface may be any of a High-Definition Multimedia Interface, DisplayPort, wireless HDMI, and/or wireless HD compliant techniques. Graphics subsystem 1015 may be integrated into processor 1010 or chipset 1005. In some implementations, graphics subsystem 1015 may be a stand-alone device communicatively coupled to chipset 1005.

The graphics and/or video processing techniques described herein may be implemented in various hardware architectures. For example, graphics and/or video functionality may be integrated within a chipset. Alternatively, a discrete graphics and/or video processor may be used. As still another implementation, the graphics and/or video functions may be provided by a general purpose processor, including a multi-core processor. In further embodiments, the functions may be implemented in a consumer electronics device.

Radio 1018 may include one or more radios capable of transmitting and receiving signals using various suitable wireless communications techniques. Such techniques may involve communications across one or more wireless networks. Example wireless networks include (but are not limited to) wireless local area networks (WLANs), wireless personal area networks (WPANs), wireless metropolitan area network (WMANs), cellular networks, and satellite networks. In communicating across such networks, radio 1018 may operate in accordance with one or more applicable standards in any version.

In various implementations, display 1020 may include any television type monitor or display. Display 1020 may include, for example, a computer display screen, touch screen display, video monitor, television-like device, and/or a television. Display 1020 may be digital and/or analog. In various implementations, display 1020 may be a holographic display. Also, display 1020 may be a transparent surface that may receive a visual projection. Such projections may convey various forms of information, images, and/or objects. For example, such projections may be a visual overlay for a mobile augmented reality (MAR) application. Under the control of one or more software applications 1016, platform 1002 may display user interface 1022 on display 1020.

In various implementations, content services device(s) 1030 may be hosted by any national, international and/or independent service and thus accessible to platform 1002 via the Internet, for example. Content services device(s) 1030 may be coupled to platform 1002 and/or to display 1020. Platform 1002 and/or content services device(s) 1030 may be coupled to a network 1060 to communicate (e.g., send and/or receive) media information to and from network 1060. Content delivery device(s) 1040 also may be coupled to platform 1002 and/or to display 1020.

In various implementations, content services device(s) 1030 may include a cable television box, personal computer, network, telephone, Internet enabled devices or appliance capable of delivering digital information and/or content, and any other similar device capable of uni-directionally or bi-directionally communicating content between content providers and platform 1002 and/display 1020, via network 1060 or directly. It will be appreciated that the content may be communicated uni-directionally and/or bi-directionally to and from any one of the components in system 1000 and a content provider via network 1060. Examples of content may include any media information including, for example, video, music, medical and gaming information, and so forth.

Content services device(s) 1030 may receive content such as cable television programming including media information, digital information, and/or other content. Examples of content providers may include any cable or satellite television or radio or Internet content providers. The provided examples are not meant to limit implementations in accordance with the present disclosure in any way.

In various implementations, platform 1002 may receive control signals from navigation controller 1050 having one or more navigation features. The navigation features of controller 1050 may be used to interact with user interface 1022, for example. In various embodiments, navigation controller 1050 may be a pointing device that may be a computer hardware component (specifically, a human interface device) that allows a user to input spatial (e.g., continuous and multi-dimensional) data into a computer. Many systems such as graphical user interfaces (GUI), and televisions and monitors allow the user to control and provide data to the computer or television using physical gestures.

Movements of the navigation features of controller 1050 may be replicated on a display (e.g., display 1020) by movements of a pointer, cursor, focus ring, or other visual indicators displayed on the display. For example, under the control of software applications 1016, the navigation features located on navigation controller 1050 may be mapped to virtual navigation features displayed on user interface 1022, for example. In various embodiments, controller 1050 may not be a separate component but may be integrated into platform 1002 and/or display 1020. The present disclosure, however, is not limited to the elements or in the context shown or described herein.

In various implementations, drivers (not shown) may include technology to enable users to instantly turn on and off platform 1002 like a television with the touch of a button after initial boot-up, when enabled, for example. Program logic may allow platform 1002 to stream content to media adaptors or other content services device(s) 1030 or content delivery device(s) 1040 even when the platform is turned "off." In addition, chipset 1005 may include hardware and/or software support for 5.1 surround sound audio and/or high definition 7.1 surround sound audio, for example. Drivers may include a graphics driver for integrated graphics platforms. In various embodiments, the graphics driver may comprise a peripheral component interconnect (PCI) Express graphics card.

In various implementations, any one or more of the components shown in system 1000 may be integrated. For example, platform 1002 and content services device(s) 1030 may be integrated, or platform 1002 and content delivery device(s) 1040 may be integrated, or platform 1002, content services device(s) 1030, and content delivery device(s) 1040 may be integrated, for example. In various embodiments, platform 1002 and display 1020 may be an integrated unit. Display 1020 and content service device(s) 1030 may be integrated, or display 1020 and content delivery device(s) 1040 may be integrated, for example. These examples are not meant to limit the present disclosure.

In various embodiments, system 1000 may be implemented as a wireless system, a wired system, or a combination of both. When implemented as a wireless system, system 1000 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 1000 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and the like. Examples of wired communications media may include a wire, cable, metal leads, printed circuit board (PCB), backplane, switch fabric, semiconductor material, twisted-pair wire, co-axial cable, fiber optics, and so forth.

Platform 1002 may establish one or more logical or physical channels to communicate information. The information may include media information and control information. Media information may refer to any data representing content meant for a user. Examples of content may include, for example, data from a voice conversation, videoconference, streaming video, electronic mail ("email") message, voice mail message, alphanumeric symbols, graphics, image, video, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The embodiments, however, are not limited to the elements or in the context shown or described in FIG. 10.

Figure 11:
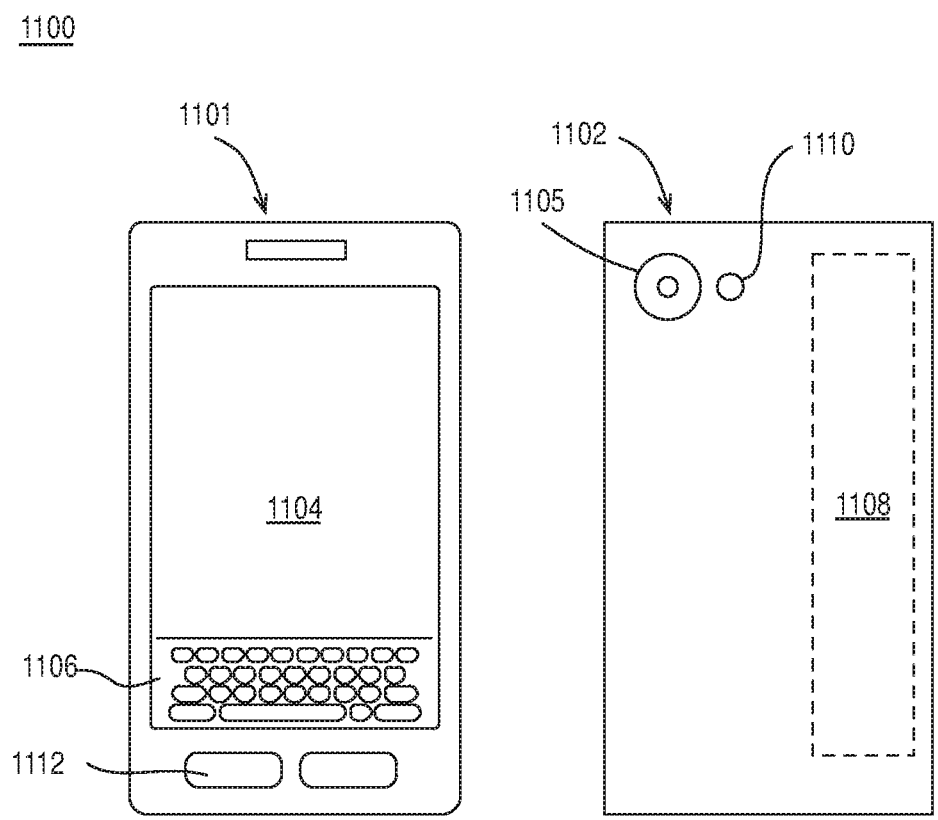
FIG. 11 illustrates an example device, all arranged in accordance with at least some implementations of the present disclosure.

As described above, system 1000 may be embodied in varying physical styles or form factors. FIG. 11 illustrates an example small form factor device 1100, arranged in accordance with at least some implementations of the present disclosure. In some examples, system 1000 may be implemented via device 1100. In other examples, device 100, system 900, or portions thereof may be implemented via device 1100. In various embodiments, for example, device 1100 may be implemented as a mobile computing device a having wireless capabilities. A mobile computing device may refer to any device having a processing system and a mobile power source or supply, such as one or more batteries, for example.

Examples of a mobile computing device may include a personal computer (PC), laptop computer, ultra-laptop computer, tablet, touch pad, portable computer, handheld computer, palmtop computer, personal digital assistant (PDA), cellular telephone, combination cellular telephone/PDA, smart device (e.g., smart phone, smart tablet or smart mobile television), mobile internet device (MID), messaging device, data communication device, cameras, and so forth.

Examples of a mobile computing device also may include computers that are arranged to be worn by a person, such as a wrist computers, finger computers, ring computers, eyeglass computers, belt-clip computers, arm-band computers, shoe computers, clothing computers, and other wearable computers. In various embodiments, for example, a mobile computing device may be implemented as a smart phone capable of executing computer applications, as well as voice communications and/or data communications. Although some embodiments may be described with a mobile computing device implemented as a smart phone by way of example, it may be appreciated that other embodiments may be implemented using other wireless mobile computing devices as well. The embodiments are not limited in this context.

As shown in FIG. 11, device 1100 may include a housing with a front 1101 and a back 1102. Device 1100 includes a display 1104, an input/output (I/O) device 1106, and an integrated antenna 1108. Device 1100 also may include navigation features 1112. I/O device 1106 may include any suitable I/O device for entering information into a mobile computing device. Examples for I/O device 1106 may include an alphanumeric keyboard, a numeric keypad, a touch pad, input keys, buttons, switches, microphones, speakers, voice recognition device and software, and so forth. Information also may be entered into device 1100 by way of microphone (not shown), or may be digitized by a voice recognition device. As shown, device 1100 may include a camera 1105 (e.g., including a lens, an aperture, and an imaging sensor) and a flash 1110 integrated into back 1102 (or elsewhere) of device 1100. In other examples, camera 1105 and flash 1110 may be integrated into front 1101 of device 1100 or both front and back cameras may be provided. Camera 1105 and flash 1110 may be components of a camera module to originate image data processed into streaming video that is output to display 1104 and/or communicated remotely from device 1100 via antenna 1108 for example.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as IP cores may be stored on a tangible, machine readable medium and supplied to various customers or manufacturing facilities to load into the fabrication machines that actually make the logic or processor.

While certain features set forth herein have been described with reference to various implementations, this description is not intended to be construed in a limiting sense. Hence, various modifications of the implementations described herein, as well as other implementations, which are apparent to persons skilled in the art to which the present disclosure pertains are deemed to lie within the spirit and scope of the present disclosure.

In one or more first embodiments, a system for performing skin detection comprises a memory configured to receive image data and a processor coupled to the memory, the processor to generate a skin model based on a skin dominant region associated with the image data and a non-skin model based on a second region associated with the image data and to classify individual pixels associated with the image data via a discriminative skin likelihood function based on the skin model and the non-skin model to generate skin label data associated with the image data.

Further to the first embodiments, the skin model comprises a color histogram based skin model, the discriminative skin likelihood function comprises a log-based discriminative skin likelihood function, and the processor to classify individual pixels comprises the processor to compare a skin classification value for a first individual pixel to a predetermined threshold value.

Further to the first embodiments, the discriminative skin likelihood function comprises at least one of a log-based classifier, a thresholding function, a Bayesian classifier, a Gaussian classifier, a multi-layer perceptron classifier, or a neural network classifier.

Further to the first embodiments, the image data comprises an image frame of a video sequence and the processor to generate the skin model and the non-skin model and to classify the individual pixels comprises the processor to generate the skin model and the non-skin model and to classify the individual pixels online with respect to the video sequence.

Further to the first embodiments, the image data comprises an image frame of a video sequence and the processor is further to receive second image data associated with a second image frame of the video sequence, to generate a second skin model and a second non-skin model based on the second image frame, and to classify second individual pixels associated with the second image data via a second discriminative skin likelihood function based on the second skin model and the second non-skin model to generate second skin label data associated with the second image data.

Further to the first embodiments, the image data comprises an image frame of a video sequence and the processor is further to receive second image data associated with a second image frame of the video sequence, generate a second skin model and a second non-skin model based on the second image frame, and to classify second individual pixels associated with the second image data via a second discriminative skin likelihood function based on the second skin model and the second non-skin model to generate second skin label data associated with the second image data such that the processor is to receive the second image data after the individual pixels of the image data are classified.

Further to the first embodiments, the skin label data further comprises, for each of the individual pixels, a classification confidence value.

Further to the first embodiments, the processor is further to determine a minimum bounding box based on a plurality of facial feature landmarks and to expand the minimum bounding box to generate the skin dominant region.

Further to the first embodiments, the image data is in a color space comprising at least one of a red green blue color space, a luminance chroma color space, a luminance blue difference red difference color space, or a hue saturation value color space.

Further to the first embodiments, the image data is in a color space comprising at least one of a red green blue color space, a luminance chroma color space, a luminance blue difference red difference color space, or a hue saturation value color space, such that the color space comprises the red, green, blue color space and such that the skin model is based on red and green channels of the red, green, blue color space.

Further to the first embodiments, the processor is further to generate a second skin model based on a second skin dominant region associated with the image data and wherein the processor to classify the individual pixels associated with the image data further comprises the processor to classify the individual pixels as first skin pixels associated with the skin dominant region or second skin pixels associated with the second skin dominant region.

In one or more second embodiments, a computer-implemented method for performing skin detection comprises generating a skin model based on a skin dominant region of an image and a non-skin model based on a second region of the image, determining a discriminative skin likelihood function based on the skin model and the non-skin model, and classifying individual pixels of the image as skin pixels or non-skin pixels based on the discriminative skin likelihood function to generate skin label data associated with the image.

Further to the second embodiments, the skin model comprises a color histogram based skin model, the discriminative skin likelihood function comprises a log-based discriminative skin likelihood function, and classifying individual pixels comprises comparing a skin classification value for a first individual pixel to a predetermined threshold value.

Further to the second embodiments, the discriminative skin likelihood function comprises at least one of a log-based classifier, a thresholding function, a Bayesian classifier, a Gaussian classifier, a multi-layer perceptron classifier, or a neural network classifier.

Further to the second embodiments, the image comprises an image frame of a video sequence and generating the skin model and the non-skin model, determining the discriminative skin likelihood function, and classifying the individual pixels are performed online during processing of the video sequence.

Further to the second embodiments, the image comprises an image frame of a video sequence and the method further comprises receiving a second image frame of the video sequence, generating a second skin model and a second non-skin model based on the second image frame, determining a second discriminative skin likelihood function based on the second skin model and the second non-skin model, and classifying second individual pixels of the second image frame based on the second discriminative skin likelihood function to generate second skin label data associated with the second image frame.

Further to the second embodiments, the image comprises an image frame of a video sequence and the method further comprises receiving a second image frame of the video sequence, generating a second skin model and a second non-skin model based on the second image frame, determining a second discriminative skin likelihood function based on the second skin model and the second non-skin model, and classifying second individual pixels of the second image frame based on the second discriminative skin likelihood function to generate second skin label data associated with the second image frame such that the second image frame is received after the individual pixels of the image are classified.

Further to the second embodiments, the skin label data further comprises, for each of the individual pixels, a classification confidence value.

Further to the second embodiments, the method further comprises determining a minimum bounding box based on a plurality of facial feature landmarks and expanding the minimum bounding box to generate the skin dominant region.

Further to the second embodiments, the image is associated with image data in a color space comprising at least one of a red green blue color space, a luminance chroma color space, a luminance blue difference red difference color space, or a hue saturation value color space.

Further to the second embodiments, the image is associated with image data in a color space comprising at least one of a red green blue color space, a luminance chroma color space, a luminance blue difference red difference color space, or a hue saturation value color space such that the color space comprises a red, green, blue color space and the skin model is based on red and green channels of the red, green, blue color space.

Further to the second embodiments, the method further comprises generating a second skin model based on a second skin dominant region of the image and determining a second discriminative skin likelihood function based on the second skin model and the second non-skin model such that classifying the individual pixels of the image further comprises classifying the individual pixels as first skin pixels associated with the skin dominant region or second skin pixels associated with the second skin dominant region.

In one or more third embodiments, a system for performing skin detection comprises means for generating a skin model based on a skin dominant region of an image and a non-skin model based on a second region of the image, means for determining a discriminative skin likelihood function based on the skin model and the non-skin model, and means for classifying individual pixels of the image as skin pixels or non-skin pixels based on the discriminative skin likelihood function to generate skin label data associated with the image.

Further to the third embodiments, the skin model comprises a color histogram based skin model, the discriminative skin likelihood function comprises a log-based discriminative skin likelihood function, and the means for classifying individual pixels comprises means for comparing a skin classification value for a first individual pixel to a predetermined threshold value.

Further to the third embodiments, the discriminative skin likelihood function comprises at least one of a log-based classifier, a thresholding function, a Bayesian classifier, a Gaussian classifier, a multi-layer perceptron classifier, or a neural network classifier.

Further to the third embodiments, the image comprises an image frame of a video sequence and the means for generating the skin model and the non-skin model, the means for determining the discriminative skin likelihood function, and the means for classifying the individual pixels are to operate online with respect to the video sequence Further to the third embodiments, the image comprises an image frame of a video sequence and the system further comprises means for receiving a second image frame of the video sequence, means for generating a second skin model and a second non-skin model based on the second image frame, means for determining a second discriminative skin likelihood function based on the second skin model and the second non-skin model, and means for classifying second individual pixels of the second image frame based on the second discriminative skin likelihood function to generate second skin label data associated with the second image frame.

Further to the third embodiments, the image comprises an image frame of a video sequence and the system further comprises means for receiving a second image frame of the video sequence, means for generating a second skin model and a second non-skin model based on the second image frame, means for determining a second discriminative skin likelihood function based on the second skin model and the second non-skin model, and means for classifying second individual pixels of the second image frame based on the second discriminative skin likelihood function to generate second skin label data associated with the second image frame such that the means for receiving the second image frame are to receive the second image frame after the individual pixels of the image are classified.

Further to the third embodiments, the skin label data further comprises, for each of the individual pixels, a classification confidence value.

Further to the third embodiments, the system further comprises means for determining a minimum bounding box based on a plurality of facial feature landmarks and means for expanding the minimum bounding box to generate the skin dominant region.

Further to the third embodiments, the image is associated with image data in a color space comprising at least one of a red green blue color space, a luminance chroma color space, a luminance blue difference red difference color space, or a hue saturation value color space.

Further to the third embodiments, the image is associated with image data in a color space comprising at least one of a red green blue color space, a luminance chroma color space, a luminance blue difference red difference color space, or a hue saturation value color space such that the color space comprises a red, green, blue color space and wherein the skin model is based on red and green channels of the red, green, blue color space.

Further to the third embodiments, the system further comprises means for generating a second skin model based on a second skin dominant region of the image and means for determining a second discriminative skin likelihood function based on the second skin model and the second non-skin model such that the means for classifying the individual pixels are further to classify the individual pixels as first skin pixels associated with the skin dominant region or second skin pixels associated with the second skin dominant region.

In one or more fourth embodiments, at least one machine readable medium comprises a plurality of instructions that, in response to being executed on a computing device, cause the computing device to perform skin detection by generating a skin model based on a skin dominant region of an image and a non-skin model based on a second region of the image, determining a discriminative skin likelihood function based on the skin model and the non-skin model, and classifying individual pixels of the image as skin pixels or non-skin pixels based on the discriminative skin likelihood function to generate skin label data associated with the image.

Further to the fourth embodiments, the skin model comprises a color histogram based skin model, the discriminative skin likelihood function comprises a log-based discriminative skin likelihood function, and classifying individual pixels comprises comparing a skin classification value for a first individual pixel to a predetermined threshold value.

Further to the fourth embodiments, the discriminative skin likelihood function comprises at least one of a log-based classifier, a thresholding function, a Bayesian classifier, a Gaussian classifier, a multi-layer perceptron classifier, or a neural network classifier.

Further to the fourth embodiments, the image comprises an image frame of a video sequence and generating the skin model and the non-skin model, determining the discriminative skin likelihood function, and classifying the individual pixels are performed online during processing of the video sequence.

Further to the fourth embodiments, the machine readable medium further comprises instructions that, in response to being executed on the computing device, cause the computing device to perform skin detection by determining a minimum bounding box based on a plurality of facial feature landmarks and expanding the minimum bounding box to generate the skin dominant region.

Further to the fourth embodiments, the machine readable medium further comprises instructions that, in response to being executed on the computing device, cause the computing device to perform skin detection by generating a second skin model based on a second skin dominant region of the image and determining a second discriminative skin likelihood function based on the second skin model and the second non-skin model such that classifying the individual pixels of the image further comprises classifying the individual pixels as first skin pixels associated with the skin dominant region or second skin pixels associated with the second skin dominant region.

In one or more fifth embodiments, at least one machine readable medium may include a plurality of instructions that in response to being executed on a computing device, causes the computing device to perform a method according to any one of the above embodiments.

In one or more sixth embodiments, an apparatus may include means for performing a method according to any one of the above embodiments.

It will be recognized that the embodiments are not limited to the embodiments so described, but can be practiced with modification and alteration without departing from the scope of the appended claims. For example, the above embodiments may include specific combination of features. However, the above embodiments are not limited in this regard and, in various implementations, the above embodiments may include the undertaking only a subset of such features, undertaking a different order of such features, undertaking a different combination of such features, and/or undertaking additional features than those features explicitly listed. The scope of the embodiments should, therefore, be determined with reference to the appended claims, along with the full scope of equivalents to which such claims are entitled.

What is claimed is:

1. A computer-implemented method for performing skin detection comprising:
  applying face detection to received image data representative of an image to detect a first skin dominant region corresponding to a first face in the image and a second skin dominant region corresponding to a second face in the image;
  combining the first and second skin dominant regions to generate a combined skin dominant region of the received image data;
  randomly selecting a background region of the received image data outside of the first and second skin dominant regions;
  generating a skin model based on the combined skin dominant region of the image data and a non-skin model based on the randomly selected background region of the image data;

determining a discriminative skin likelihood function based on the skin model and the non-skin model; and classifying individual pixels of the image data as skin pixels or non-skin pixels based on the discriminative skin likelihood function to generate skin label data associated with the image data; and outputting the skin label data, wherein the skin label data comprises one of a binary value of skin or non-skin for each of the individual pixels or a confidence value of skin pixel classification for each of the individual pixels.

2. The method of claim 1, wherein the skin model and the non-skin model are color histogram based models and the discriminative skin likelihood function is a neural network classifier.

3. The method of claim 1, wherein the image data corresponds to an image frame of a video sequence, and wherein generating the skin model and the non-skin model, determining the discriminative skin likelihood function, and classifying the individual pixels are performed online during processing of the video sequence.

4. The method of claim 1, wherein the image data corresponds to an image frame of a video sequence, the method further comprising:

receiving second image data corresponding to a second image frame of the video sequence;

generating a second skin model and a second non-skin model based on the second image data;

determining a second discriminative skin likelihood function based on the second skin model and the second non-skin model; and classifying second individual pixels of the second image data based on the second discriminative skin likelihood function to generate second skin label data associated with the second image data.

5. The method of claim 4, wherein the second image data is received after the individual pixels of the image data are classified.

6. The method of claim 1, wherein applying face detection comprises determining a minimum bounding box based on a plurality of facial feature landmarks and expanding the minimum bounding box to generate the first skin dominant region.

7. The method of claim 1, wherein the image data is in a color space comprising at least one of a red green blue color space, a luminance chroma color space, a luminance blue difference red difference color space, or a hue saturation value color space.

8. The method of claim 7, wherein the color space comprises a red, green, blue color space and wherein the skin model is based on only red and green channels of the red, green, blue color space.

9. A system for performing skin detection comprising:

a memory configured to receive image data representative of an image; and a processor coupled to the memory, the processor to:

apply face detection to the received image data to detect a first skin dominant region corresponding to a first face in the image and a second skin dominant region corresponding to a second face in the image;

combine the first and second skin dominant regions to generate a combined skin dominant region of the received image data;

randomly select a background region of the received image data outside of the first and second skin dominant regions;

generate a skin model based on the combined skin dominant region of the image data and a non-skin model based on the randomly selected background region of the image data;

determine a discriminative skin likelihood function based on the skin model and the non-skin model;

classify individual pixels of the image data as skin pixels or non-skin pixels based on the discriminative skin likelihood function to generate skin label data associated with the image data; and output the skin label data, wherein the skin label data comprises one of a binary value of skin or non-skin for each of the individual pixels or a confidence value of skin pixel classification for each of the individual pixels.

10. The system of claim 9, wherein the skin model and the non-skin model are color histogram based models and the discriminative skin likelihood function is a neural network classifier.

11. The system of claim 9, wherein the image data corresponds to an image frame of a video sequence, and wherein the processor to generate the skin model and the non-skin model, determine the discriminative skin likelihood function, and classify the individual pixels comprises the processor to generate the skin model and the non-skin model and to classify the individual pixels online with respect to the video sequence.

12. The system of claim 9, wherein the image data corresponds to an image frame of a video sequence and the processor is further to:

receive second image data corresponding to a second image frame of the video sequence;

generate a second skin model and a second non-skin model based on the second image frame;

determine a second discriminative skin likelihood function based on the second skin model and the second non-skin model; and classify second individual pixels of the second image data based on the second discriminative skin likelihood function to generate second skin label data associated with the second image data.

13. The system of claim 9, wherein the processor to apply face detection comprises the processor to determine a minimum bounding box based on a plurality of facial feature landmarks and to expand the minimum bounding box to generate the first skin dominant region.

14. The system of claim 9, wherein the image data is in a color space comprising at least one of a red green blue color space, a luminance chroma color space, a luminance blue difference red difference color space, or a hue saturation value color space.

15. The system of claim 14, wherein the color space comprises a red, green, blue color space and wherein the skin model is based on only red and green channels of the red, green, blue color space.

16. At least one non-transitory machine readable medium comprising a plurality of instructions that, in response to being executed on a computing device, cause the computing device to perform skin detection by:

applying face detection to received image data representative of an image to detect a first skin dominant region corresponding to a first face in the image and a second skin dominant region corresponding to a second face in the image;

combining the first and second skin dominant regions to generate a combined skin dominant region of the received image data;

randomly selecting a background region of the received image data outside of the first and second skin dominant regions;

generating a skin model based on the combined skin dominant region of the image data and a non-skin model based on the randomly selected background region of the image data;

determining a discriminative skin likelihood function based on the skin model and the non-skin model; and classifying individual pixels of the image data as skin pixels or non-skin pixels based on the discriminative skin likelihood function to generate skin label data associated with the image data; and outputting the skin label data, wherein the skin label data comprises one of a binary value of skin or non-skin for each of the individual pixels or a confidence value of skin pixel classification for each of the individual pixels.

17. The non-transitory machine readable medium of claim 16, wherein the skin model and the non-skin model are color histogram based models and the discriminative skin likelihood function is a neural network classifier.

18. The non-transitory machine readable medium of claim 16, wherein the image data corresponds to an image frame of a video sequence, and wherein generating the skin model and the non-skin model, determining the discriminative skin likelihood function, and classifying the individual pixels are performed online during processing of the video sequence.

19. The non-transitory machine readable medium of claim 16, wherein applying face detection comprises determining a minimum bounding box based on a plurality of facial feature landmarks and expanding the minimum bounding box to generate the first skin dominant region.

20. The non-transitory machine readable medium of claim 16, wherein the image data is in a color space comprising at least one of a red green blue color space, a luminance chroma color space, a luminance blue difference red difference color space, or a hue saturation value color space.

* * * * *